United States Patent
Svartz et al.

(10) Patent No.: US 7,350,795 B2
(45) Date of Patent: Apr. 1, 2008

(54) SUSPENSION

(75) Inventors: Bjorn O. Svartz, Jamestown, NC (US);
Darris L. White, Port Orange, FL (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 11/047,133

(22) Filed: Jan. 31, 2005

(65) Prior Publication Data

US 2005/0189736 A1  Sep. 1, 2005

Related U.S. Application Data

(62) Division of application No. 10/790,348, filed on Mar. 1, 2004, now abandoned, which is a division of application No. 09/879,727, filed on Jun. 6, 2001, now abandoned.

(60) Provisional application No. 60/212,031.

(51) Int. Cl.
*B60G 11/46* (2006.01)
(52) U.S. Cl. .................... 280/124.163; 280/124.128
(58) Field of Classification Search ......... 280/124.153, 280/124.128, 124.163, 124.17, 124.11, 5.506, 280/5.508, 5.514, 6.157, 6.158
See application file for complete search history.

(56) References Cited

U.S. PATENT DOCUMENTS

| | | | |
|---|---|---|---|
| 2,810,587 A | 10/1957 | Boughner | |
| 2,913,252 A | 11/1959 | Norrie | |
| 2,959,426 A * | 11/1960 | Angustin | 267/64.19 |
| 3,013,809 A * | 12/1961 | Szostak | 280/6.158 |
| 3,033,591 A | 5/1962 | Ward | |
| 3,120,962 A * | 2/1964 | Long, Jr. | 280/6.158 |
| 3,434,707 A * | 3/1969 | Raidel | 267/31 |
| 3,510,149 A | 5/1970 | Raidel | |
| 3,707,298 A | 12/1972 | Henry | |
| 3,754,774 A | 8/1973 | Nelson | |
| 3,782,753 A * | 1/1974 | Sweet et al. | 280/124.101 |
| 3,883,153 A | 5/1975 | Singh et al. | |
| 4,033,608 A | 7/1977 | Sweet et al. | |
| 4,097,034 A * | 6/1978 | Sweet et al. | 267/241 |

(Continued)

FOREIGN PATENT DOCUMENTS

EP  0 499 887  8/1992

(Continued)

*Primary Examiner*—Eric Culbreth
*Assistant Examiner*—Barry Gooden, Jr.
(74) *Attorney, Agent, or Firm*—Martin Farrell

(57) ABSTRACT

A rear axle suspension for a highway truck that includes a pair of trailing arms suspended below a frame by a pair of hanger brackets. The hanger brackets define a pivot axis for the trailing arms. A supplemental axle locating member is attached to the axle and includes an extension member that is engageable with a bracket held by the frame. The hanger brackets are laterally compliant and each comprise an inner and outer plate, one of which is bent outwardly to define a gap within which an associated trailing arm is mounted. A moment canceling member extends between the hanger brackets and resists outward bending of the brackets. A height control valve is operated by an operating rod having an axis that passes through, or in close proximity, to the roll center of the vehicle in order to reduce ride height errors.

11 Claims, 7 Drawing Sheets

U.S. PATENT DOCUMENTS

| | | | |
|---|---|---|---|
| 4,245,852 A | 1/1981 | Lie et al. | |
| 4,334,696 A | 6/1982 | Bergstrom | |
| 4,397,478 A * | 8/1983 | Jensen et al. | 280/6.159 |
| 4,506,910 A | 3/1985 | Bierens | |
| 4,541,653 A | 9/1985 | Raidel | |
| 4,566,719 A | 1/1986 | Vanderberg | |
| 4,705,294 A | 11/1987 | Raidel | |
| 4,763,923 A * | 8/1988 | Raidel | 280/86.5 |
| 4,911,417 A | 3/1990 | Short | |
| 4,927,173 A | 5/1990 | Clifton, Jr. | |
| 4,998,749 A | 3/1991 | Bockewitz | |
| 5,112,078 A | 5/1992 | Galazin et al. | |
| 5,351,986 A * | 10/1994 | Hedenberg et al. | 280/124.163 |
| 5,375,871 A | 12/1994 | Mitchell et al. | |
| 5,476,285 A | 12/1995 | Dickerson | |
| 5,690,353 A | 11/1997 | Vanderberg | |
| 5,785,345 A | 7/1998 | Barlas et al. | |
| 5,971,425 A | 10/1999 | Dinsley et al. | |
| 6,062,579 A * | 5/2000 | Fortier | 280/124.1 |
| 6,073,946 A | 6/2000 | Richardson | |
| 6,073,947 A | 6/2000 | Gottschalk et al. | |
| 6,135,470 A | 10/2000 | Dudding | |
| 6,135,483 A | 10/2000 | Metz | |
| 6,209,895 B1 | 4/2001 | Mueller et al. | |
| 6,257,597 B1 | 7/2001 | Galazin | |
| 6,279,950 B1 | 8/2001 | Armstrong | |
| 6,783,138 B2 * | 8/2004 | Reiner et al. | 280/124.16 |

FOREIGN PATENT DOCUMENTS

| | | |
|---|---|---|
| FR | 2521502 | 8/1983 |
| GB | 2 187 149 | 9/1987 |
| JP | 55099405 | 7/1980 |
| JP | 59220409 | 12/1984 |

* cited by examiner

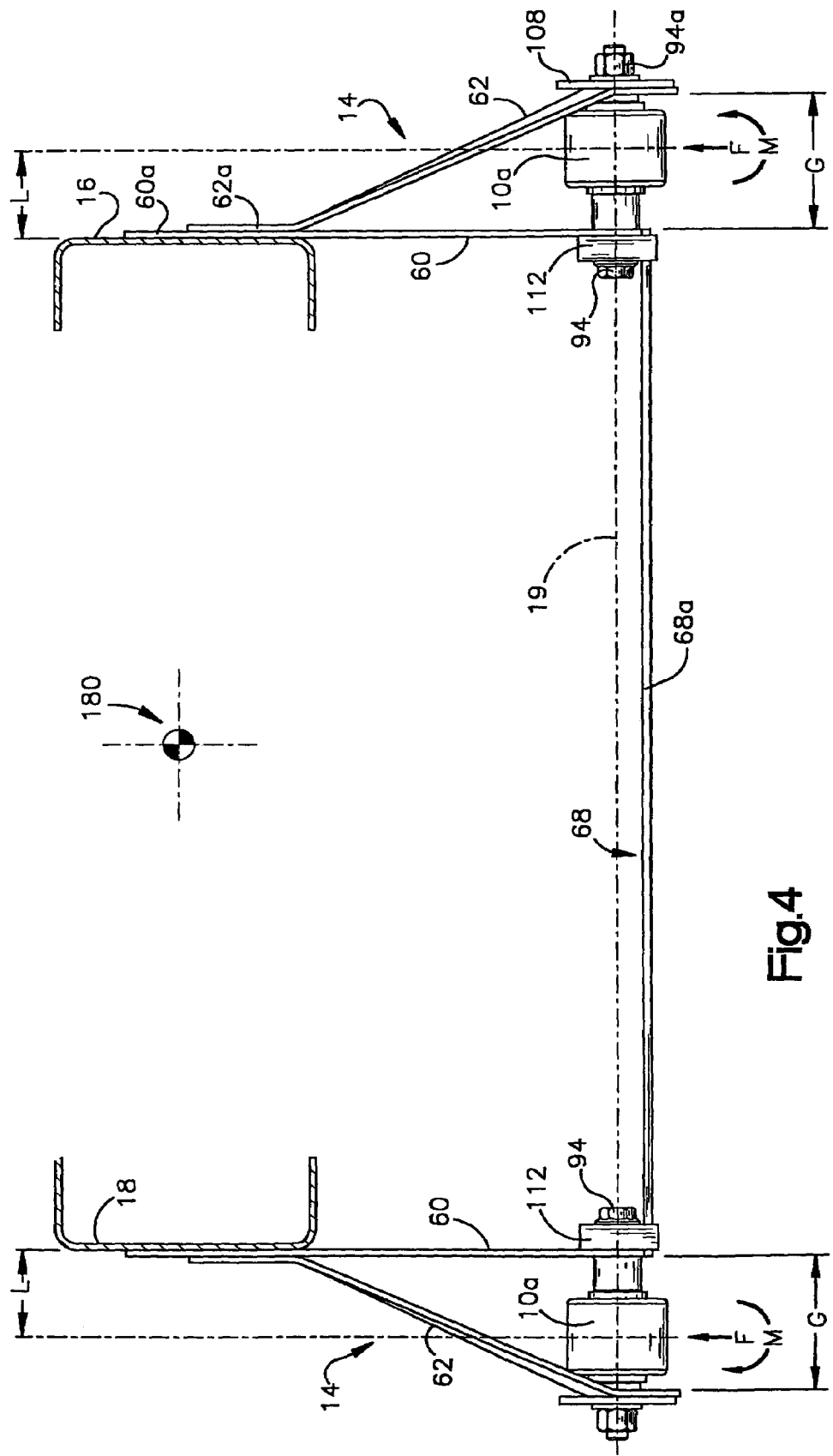

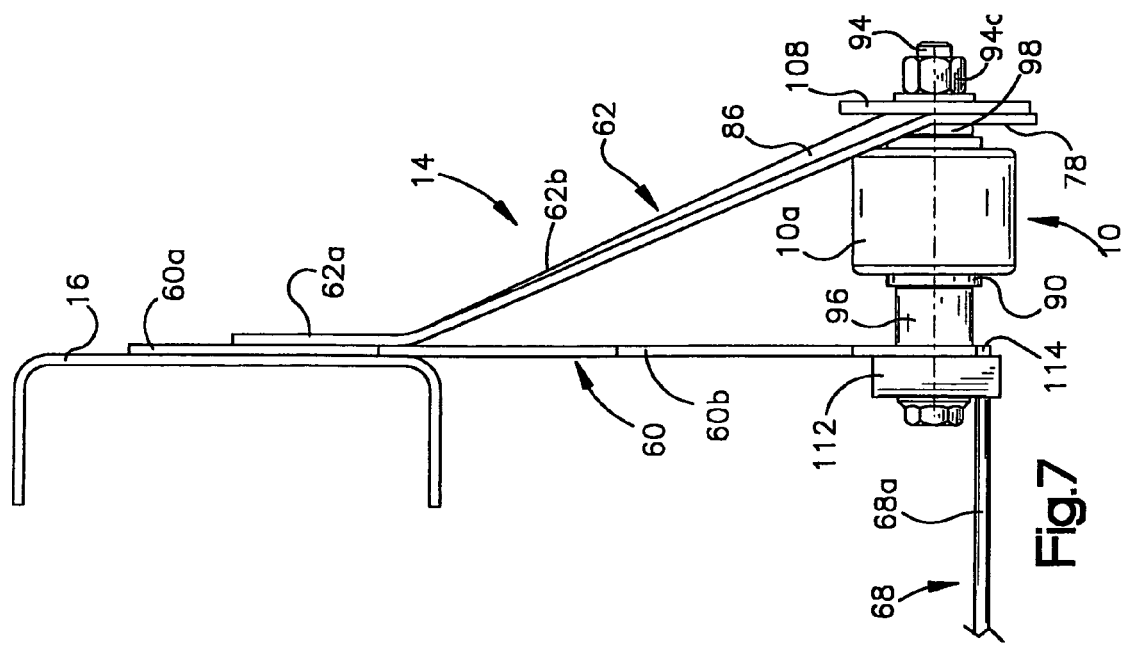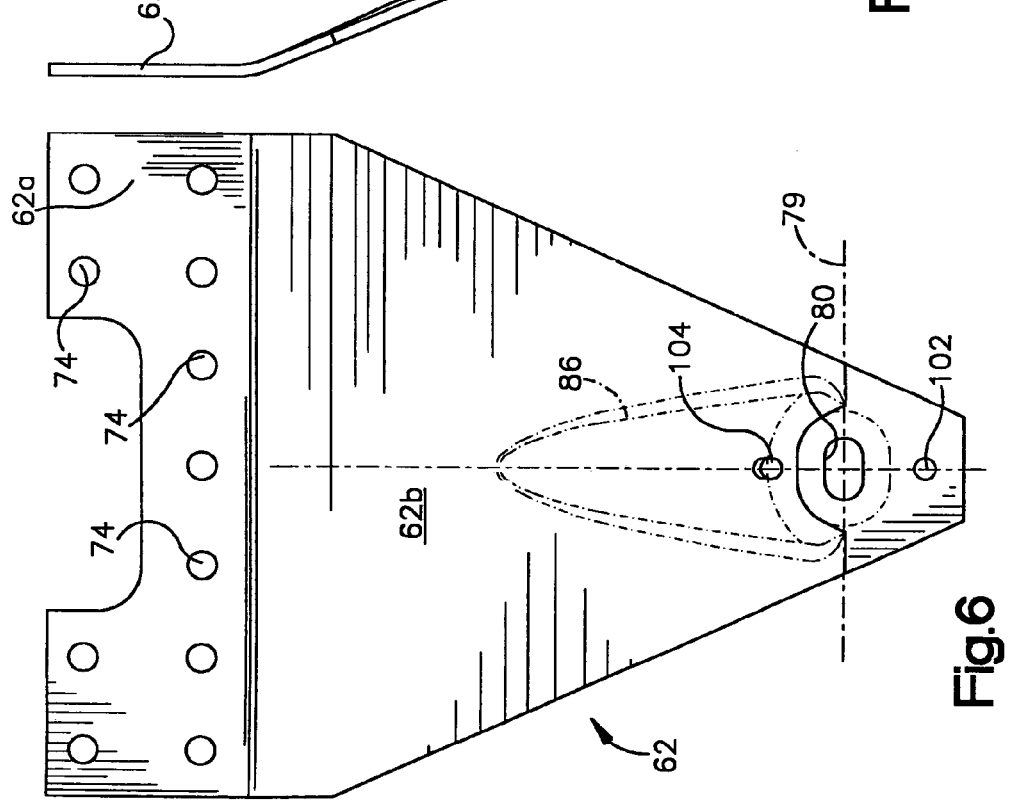

SUSPENSION

TECHNICAL FIELD

The present application relates generally to suspensions and, in particular, to a rear, trailing arm type suspension.

BACKGROUND ART

Many vehicles such as highway trucks include trailing arm type suspensions which support a rear axle and define its path of movement with respect to the vehicle frame. In some current highway truck designs, each trailing arm is constructed of spring steel and may comprise one or more "leaves." The term "leaves" is used because at least some of the trailing arms being used by truck manufacturers are being made by leaf spring manufacturers from materials and in configurations that are or were used in "leaf" springs. In conventional designs of this type of suspensions, outboard ends of the axle are secured to respective trailing arms and, in effect, the arms support and locate the axle with respect to the vehicle frame.

In some current suspension designs, the leading end of the trailing arm is suspended below its associated frame member by a hanger bracket. These hanger brackets are typically rigid cast components, and substantially resist bending in response to torsional stresses placed on the bracket by the trailing arm. These brackets typically depend downwardly only a short distance with respect to the frame. As a result, the distance between the trailing arm pivot axis and ground can be substantial. The distance of the pivot axis above ground level can affect the ride quality of the vehicle. It is usually desirable to lower the pivot axis when possible. However, simply elongating an existing hanger bracket design in order to lower the trailing arm pivot axis, does not provide satisfactory performance.

DISCLOSURE OF INVENTION

The present invention provides a new and improved suspension that is suitable as a rear suspension for a trailing arm type suspension, such as those found in highway trucks.

According to one feature of the invention, the suspension includes a trailing arm pivotally connected to a frame member by a hanger bracket. A rear axle is attached to the trailing arm. A supplemental axle locating member is provided which supplementally locates the axle with respect to the frame. In the illustrated embodiment, the locating member is attached to the axle and includes an upwardly extending finger that is engageable with a bracket secured to the frame. The bracket includes abutment surfaces slidably engageable with the extension finger.

According to another feature of the invention, a rear suspension is disclosed that includes laterally compliant hanger brackets which define a pivot axis for the trailing arms that is substantially lower than conventional designs. Each hanger bracket comprises a pair of compliant steel plates. Top portions of the plates are connected to an associated frame rail. In the illustrated embodiment, an inner plate is substantially planar, whereas an outer plate is bent outwardly and then downwardly to define a planar mounting section that is parallel to the plane of the inner plate. A gap is defined between the plates within which the leading end of the trailing arm is secured. The position of the trailing arm with respect to the hanger is adjustable in order to precisely locate the axle with respect to the frame. Specially configured spacer and mounting components are utilized to provide clamping forces that resist relative movement between the hanger bracket and trailing arm after an adjustment is made.

According to another feature of the invention, each trailing arm includes a spring seat to which an air spring is attached. The line of action for the air spring is located such that it passes through the frame sheer center of its associated frame rail. In addition, the location of the air spring takes advantage of clearance provided by the inner periphery of an associated wheel. As a result, the air springs are mounted nearer the outboard ends of the axle, as compared to more conventional designs.

According to another feature of the invention, a shock bracket is provided that includes ears that provide some protection for shock in the event of impact.

According to another feature of the invention, an air valve operating configuration is provided which reduces ride height errors. In particular, an air spring control valve is attached to a frame member and includes a control lever. An operating rod couples the lever to the axle. In the illustrated embodiment, the operating rod is connected to a mounting member extending from a shock mount. The axis of the operating rod is configured such that it passes through or in close proximity to the roll center of the vehicle. As a result, rolling of the vehicle body when rounding a curve eliminates or substantially reduces ride height errors.

Additional features of the invention will become apparent and a fuller understanding obtained by reading the following detailed description made in connection with the accompanying drawings.

BRIEF DESCRIPTION OF DRAWINGS

FIG. 4 is a fragmentary, front view of a trailing arm mounting forming part of the present invention;

FIG. 6 is a side elevational view of another plate that forms part of the trailing arm hanger bracket constructed in accordance with the preferred embodiment of the invention;

FIG. 6A is an end view of the plate shown in FIG. 6;

FIG. 7 is a fragmentary, front view of the hanger bracket and trailing arm mounting;

BEST MODE FOR CARRYING OUT THE INVENTION

Figure 1:
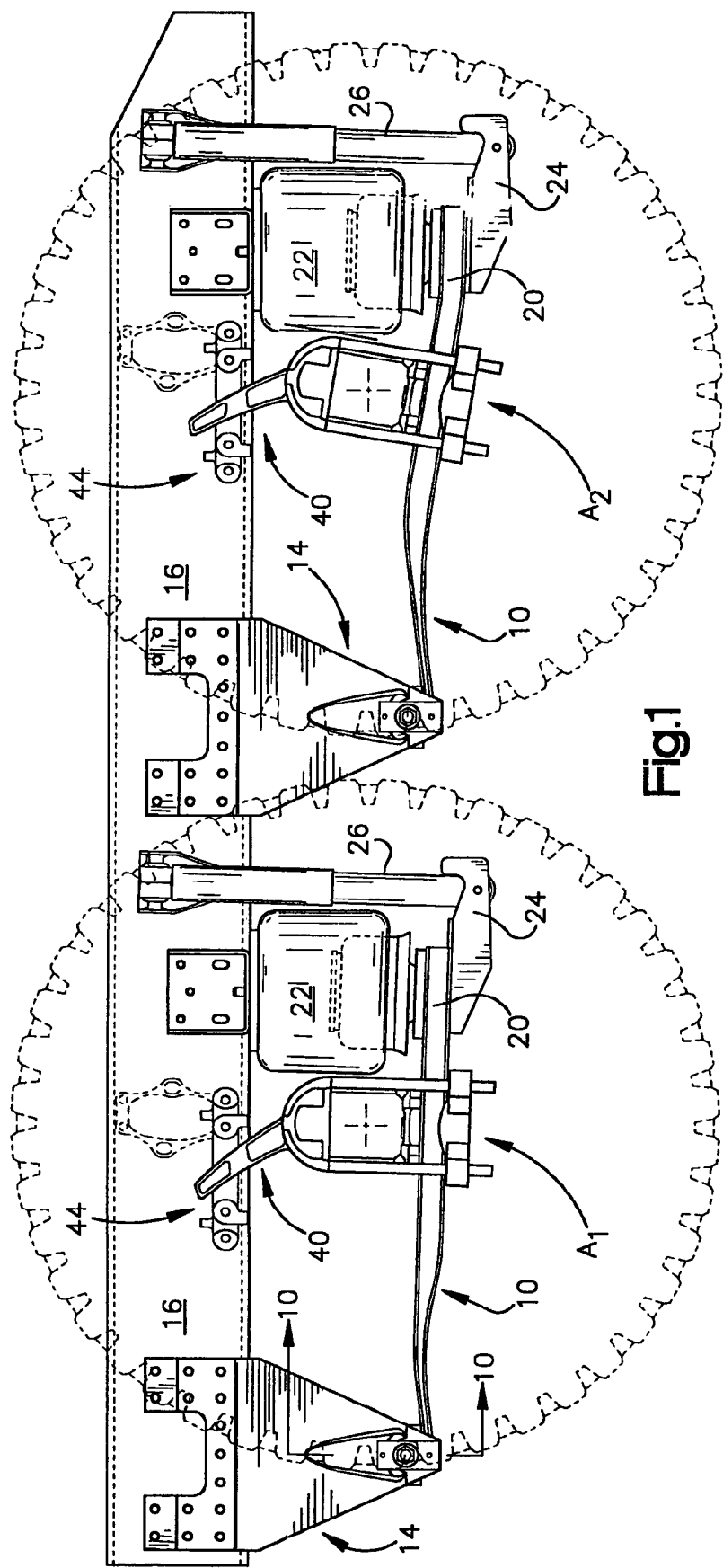
FIG. 1 is a side elevational view of a rear suspension for a dual axle vehicle, such as a Class 8 highway truck.

FIG. 1 illustrates a rear suspension of a tractor unit of a highway truck constructed in accordance with the preferred embodiment of the invention. The illustrated suspension is intended for use with a tractor unit having dual rear axles, indicated generally by the reference characters A1, A2. However, the invention can be used with a tractor unit having a single rear axle.

Figure 2:
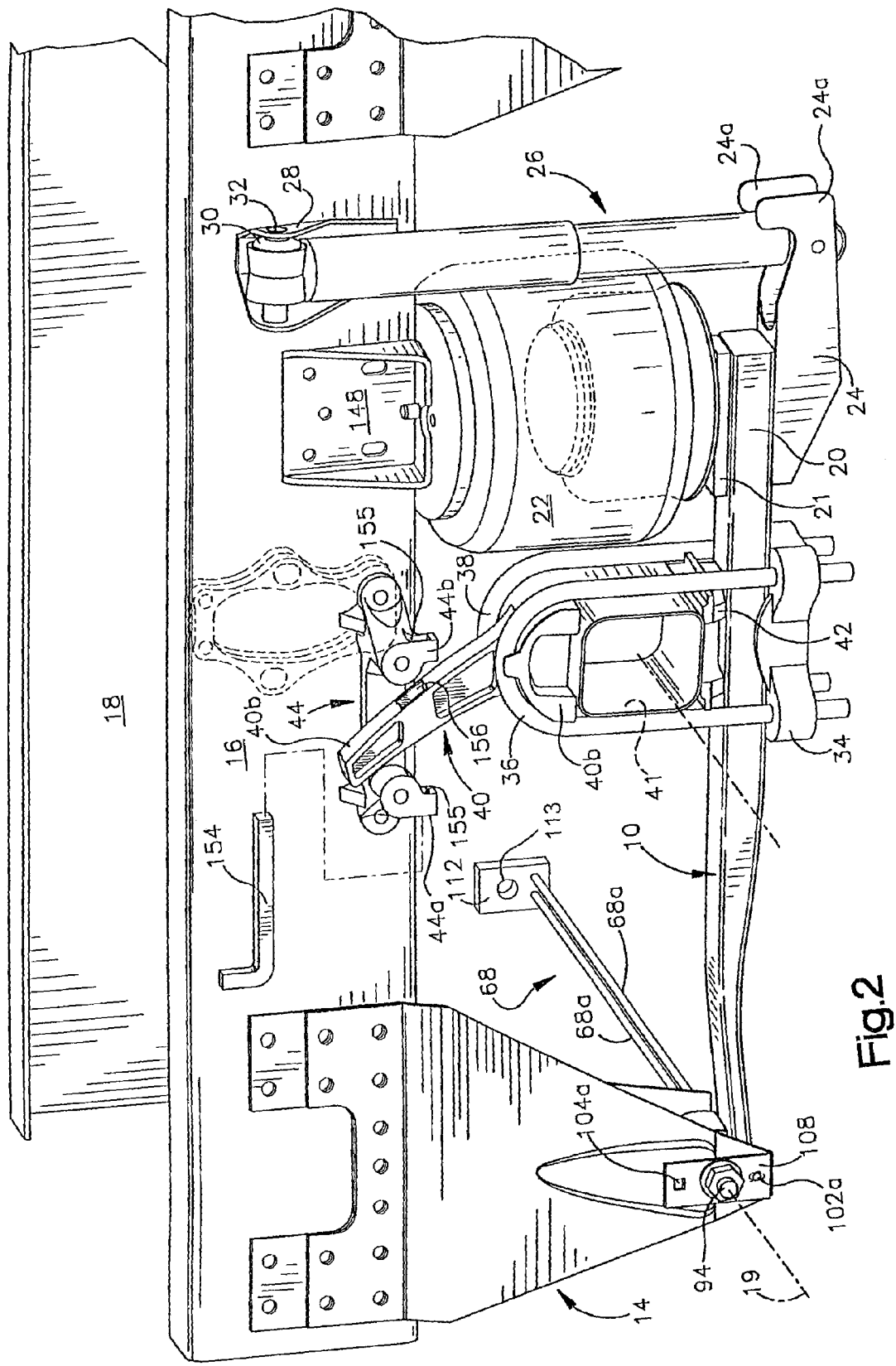
FIG. 2 is a fragmentary perspective view of the suspension shown in FIG. 1.

For purposes of explanation, the suspension components for the leading rear axle A1 will be described and are illustrated in FIG. 2. It should be understood, however, that the inventive features can be used on either or both of the rear axle suspensions.

The suspension illustrated in FIG. 2 is best characterized as a trailing arm, pneumatic or air suspension. In particular, the suspension includes a trailing arm 10, the forward end of which is held by a trailing arm hanger bracket 14. As seen best in FIG. 2, the hanger bracket 14 is mounted to and depends downwardly from the side of a frame rail or frame member 16 and defines a pivot axis 19 for the trailing arm 10. Like components (not shown) are mounted to an opposite frame member 18.

Figure 8:
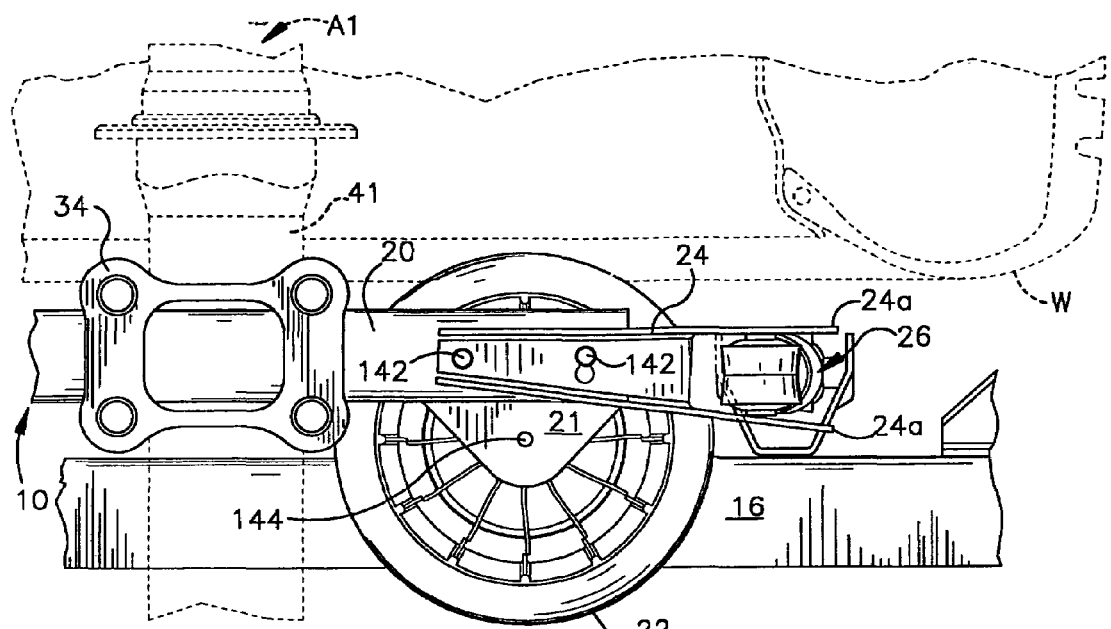
FIG. 8 is a fragmentary, bottom view of the suspension shown in FIG. 2.

Referring also to FIG. 8, the opposite end (i.e. trailing end 20) of the trailing arm 10 defines a seat 21 for a spring unit 22. In the illustrated embodiment, the spring unit comprises a conventional pneumatic cushion filled with air at a predetermined pressure. The air pressure acts as an air spring and may be varied to change the spring rate. A rearwardly extending bracket 24 connects the trailing end 20 of the trailing arm 10 to a shock absorber 26. In effect, the shock absorber 26 interconnects the trailing end 20 of the trailing arm 10 to the frame 16. The upper half or "fixed" end of the shock absorber 26 is secured to a bracket 28 that is attached to the frame 16. The upper part of the shock, preferably includes an elastomeric bushing 30. A securing bolt 32 extends through the bracket 28 and through the bushing 30 to secure the upper part of the shock 26 to the frame 16. The bushing 30 does allow some movement of the upper part of the shock to accommodate movement in the lower part of the shock as the trailing arm 10 rotates clockwise or counterclockwise about its pivot 19. The lower part of the shock 26 is pivotally connected to the extension bracket 24.

In the preferred embodiment, the trailing arm 10 is formed from spring steel and, in effect, acts as a single leaf-type spring. Spring steel is used as the trailing arm because its elasticity does allow some bending movement and, as a result, reduces stress levels at the various mounting points including the mounting location for the vehicle axle.

According to one feature of the invention, a supplemental axle locating device 40 is provided which acts to inhibit fore and aft movement in the axle housing should a failure in the trailing arm occur. In prior art suspensions, multiple spring leaves are used to define the trailing arm.

In the type of suspension illustrated in FIG. 1, the position of the axle housing is determined by its attachment to the trailing arm 10. During use, the axle moves upwardly and downwardly with respect to the frame 16, to accommodate road irregularities. Its path of movement is defined by the trailing arm 10.

In the illustrated construction, an outboard end of an axle housing 41 is held to the trailing arm 10 by a pair of U-bolts 36, 38 which extend through a lower bracket 34 and which in effect clamp the axle housing to the trailing arm. According to the invention, the supplemental axle locating member 40 is also held in position by the U-bolts 36, 38. In particular, the left outboard end of the axle housing 41 (shown in phantom in FIG. 8) sits on a saddle 42 which in turn rests on the trailing arm 10. In the preferred embodiment, a dowel pin (not shown) extends downwardly from the saddle 42 and engages a hole (not shown) formed in the trailing arm 10. The dowel pin serves to help locate the axle housing 41 on the trailing arm 10 and resists relative movement between The trailing arm 10 and the axle housing 41.

Figure 3:
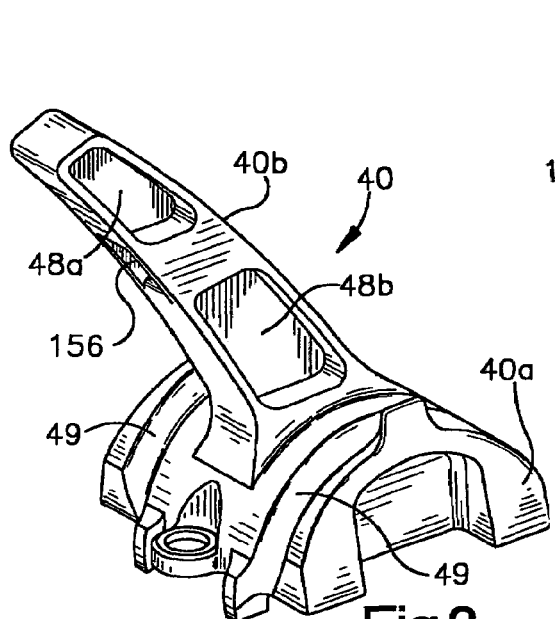
FIG. 3 is a perspective view of a supplemental axle locating member forming part of the present invention.
Figure 3A:
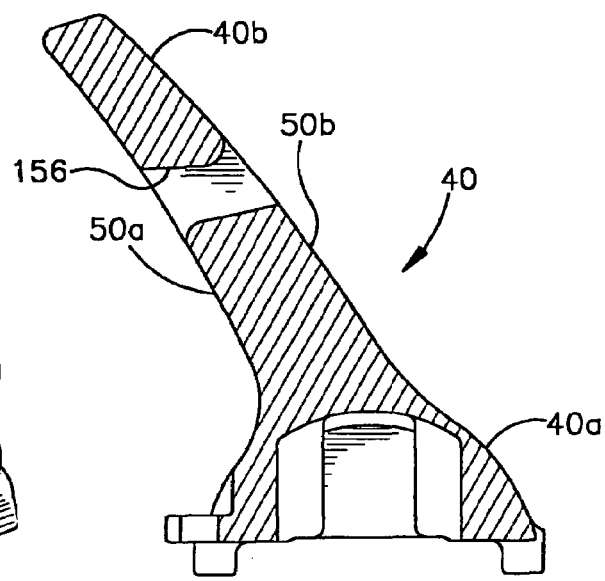
FIG. 3A is a sectional view of the supplemental axle locating member.

As seen best in FIGS. 3 and 3A, the supplemental axle locating device 40 includes an axle engaging portion 40a which rests atop the axle housing 41 and a shark fin or finger-like extension 40b (shown in FIGS. 3 and 3A), which extends upwardly and in a slightly forward direction. The finger 40b is engageable with a catcher bracket 44 which is secured to the side of the frame member 16. In the preferred embodiment, the supplemental locating member 40 is made from cast aluminum to reduce weight and includes cavities or recesses such as 48a and 48b, to also reduce weight. The finger-like extension 40b is also preferably tapered. The axle engaging portion 40a also includes semi-circular grooves 49 which receive the upper portions of the U-bolts 36, 38.

The finger-like extension 40b is angled forwardly since the axle housing in normal operation moves in an arc defined by the trailing arm 10. The catcher bracket 44 includes front and rear abutments 44a, 44b which are engageable with fore and aft surfaces 50a, 50b, respectively of the finger 40b. In operation, should a failure in the trailing arm 10 occur between its forward mounting and the axle mounting, the catcher bracket 44 will inhibit fore and aft movement of the axle housing. It should be understood that the air spring 22 and shock 26 will continue to serve their intended purposes and control the vertical motion of the axle.

In an alternate embodiment, a longitudinal plate (i.e., parallel to the frame member) may be mounted across the abutments 44a, 44b which would inhibit the lateral movement of the axle, i.e., movement in a direction orthogonal to the direction of travel of the vehicle. In addition, a stop (not shown) may be added to the top of the extending finger 40b to inhibit the finger from moving downwardly, out of the catcher bracket 44.

Returning to FIG. 2, the disclosed suspension includes features which reduced drive line vibration. This is achieved by lowering the pivot axis 19 of the suspension. With prior art designs, lowering the suspension pivot point normally results in increased costs, reduce U-bolt integrity, lower traction capabilities and reduced roll stability. The disclosed suspension reduces or eliminates these disadvantages by utilizing interconnected, laterally compliant hanger brackets for the trailing arms.

FIG. 4 illustrates a suspension incorporating this aspect of the present invention. The suspension includes a pair of the pivot arm hanger brackets 14 secured to respective frame members 16, 18. Each hanger bracket is defined by a pair of plates 60, 62, preferably steel plates, which are laterally compliant. In prior art designs, the trailing arm brackets are typically cast and have very little, if any, elasticity. The hanger brackets 14 extend downwardly and are dimensioned such that the pivot axis 19 for the suspension is lowered as compared to more conventional systems.

Figure 5:
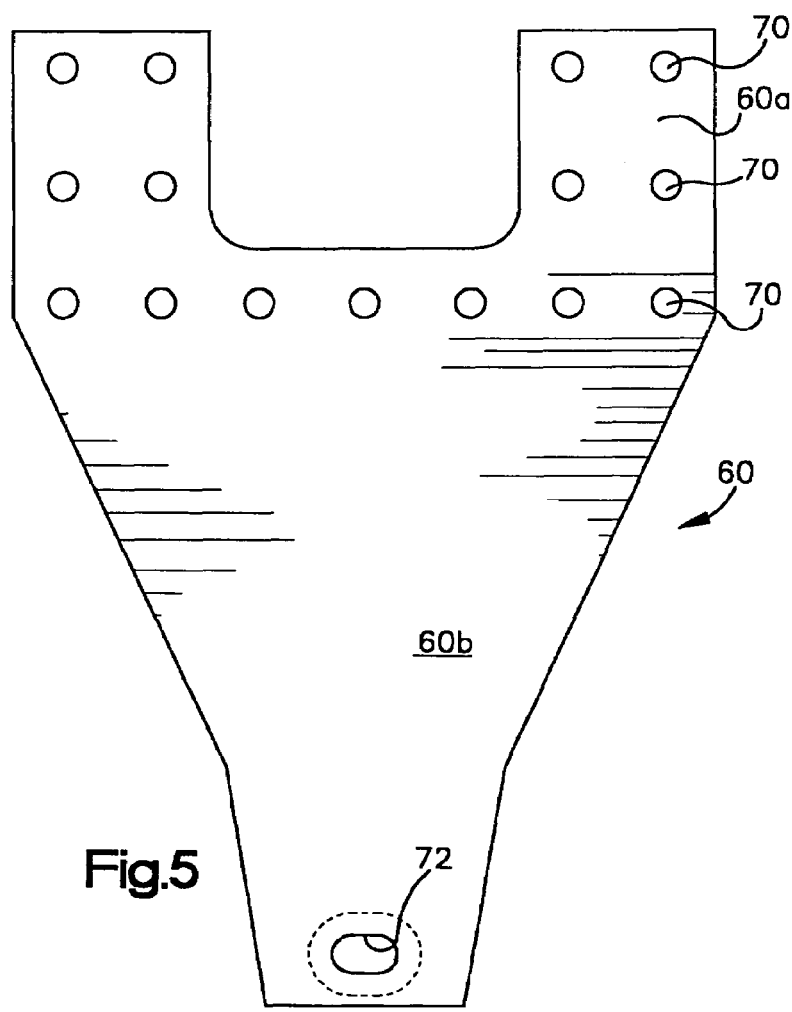
FIG. 5 is a side view of one of the plates that comprise a trailing arm hanger bracket constructed in accordance with a preferred embodiment of the invention.

Referring also to FIG. 5, the inner plate 60 of each hanger 14 extends downwardly from the associated frame member and is planar. Referring to FIGS. 6 and 6A, the outboard plate 62 includes an upper portion 62a that is secured directly to and abuts the inboard plate 60. The outboard plate 62 is bent outwardly to define a gap G (shown in FIG. 4) at its lower end for receiving the forward end of the trailing arm 10. Due to the illustrated configuration, a bending moment M is generated in each hanger bracket 14 when loaded tending to bend each hanger bracket outwardly. The level of the bending moment M is equal to the load F multiplied by the moment arm L shown in FIG. 4.

According to the invention, the hanger brackets are interconnected by a moment canceling member 68. The canceling member 68 resists outward bending of the hanger brackets 14.

FIGS. 2, 5, 6, and 6A illustrate details of the preferred embodiment of this aspect of the invention. The planar inner plate 60 is best shown in FIG. 5. As seen in FIG. 5, the inner plate includes a mounting portion 60a having a plurality of mounting holes 70 by which the plate 60 is secured to the side of the frame member 16. The inner plate 60 includes a generally triangular portion 60b which extends downwardly from its mounting portion 60a. An oblong hole 72 is located near the bottom of the plate 60.

Referring in particular to FIGS. 6 and 6A, the outboard plate 62, in side view, is similar in shape to the inner plate 60 and includes a mounting portion 62a having a plurality of holes 74 by which the plate 62 is secured to the plate 60 and frame member 16. A triangular portion 62b extends downwardly from the mounting portion 62a. As seen in FIG. 6A, the outboard plate 62 is not planar. The triangular shaped portion 62b is bent outwardly and then downwardly to define a mounting section 78 of the plate 62, which is parallel to the inner plate 60. In the preferred embodiment, an oblong mounting hole 80 is formed in the outboard plate and is aligned with the oblong hole 72 in the inner plate 60 when the inner and outer plates 60, 62 are mounted to the frame 16. In the preferred embodiment, the lower mounting section 78 of the outboard plate 62 is bent along a line 79 that passes through the center of its oblong hole 80. In addition, an outwardly protruding boss 86 is formed in the outboard plate 62 to strengthen the mounting and to provide clearance for various trailing arm components to be described.

Referring also to FIG. 7, the mounting of the forward end of the trailing arm 10 is illustrated. In particular, the trailing arm includes a circular mount 10a which receives an elastomeric bushing 90. A throughbolt 94 extends through the oblong hole 72 in the inner bracket plate 60, through the trailing arm bushing 90 and through the oblong mounting hole 80 of the outboard plate 62. The axial position of the trailing arm mount 10a within the bracket 14 is determined by fixed spacers 96, 98 located on either side of the trailing arm and which abut the trailing arm bushing 90. As seen best in FIG. 7, the outwardly extending protrusion or boss 86 of the outboard hanger plate 62 provides clearance for the upper part of the trailing arm mount 10a and its associated bushing 90.

The mounting holes 72, 80 in the inner and outer plates 60, 62, respectively are preferably oblong in order to provide a means for adjusting the longitudinal position of the axle with respect to the frame 16. As seen in FIG. 6, the outboard plate 62 includes aligned holes 102, 104 that are located above and below the oblong mounting hole 80. Referring also to FIG. 2, a trailing arm adjustment plate 108 is used to adjust the position of the trailing arm pivot mount 10a with respect to its associated bracket 14. In particular, the plate 108 includes two holes 102a, 104a vertically aligned with a center hole 105 (shown in FIG. 10). The center hole is sized to receive the mounting bolt 94 and, when installed in position, is aligned with the oblong hole 80 in the hanger bracket 14. The lower hole 102a is alignable with the lower hole 102 of the hanger bracket plate 62 and is sized such that a bolt can be placed through the holes 102a, 102 and, in effect, defines a pivot for the adjustment plate 108. The upper hole 104a is sized to receive a pry bar, lever or other suitable tool through which the upper hole 104 of the outboard plate 62 can be engaged. The pry bar or other lever-type tool can be used to move the upper part of the adjustment plate 108 fore and aft to move the pivot bolt 94 (and hence the pivot axis 19) of the trailing arm fore and aft within the aligned slots 72, 80 in the hanger bracket 14. Movement of the pivot axis 19 is used to adjust the final position of the axle with respect to the frame of the vehicle. After the adjustment is made, the mounting bolt 94 is locked in position (using nut 94a) in order to lock the position of the trailing arm pivot mount 10a.

As indicated above, the hanger brackets 14 are interconnected by a moment canceling member 68 in order to cancel out or reduce outward bending movement of the hangers 14. In the preferred and illustrated embodiment, the moment canceling member is at least one wire element 68a (see FIG. 2) that extends between mounting blocks 112 that are secured to the inner bracket plates 60 by respective securing bolts 94.

In a more preferred embodiment, a pair of wires 68a is utilized to provide some redundancy should a failure in one of the wires occur. For a Class 8 truck suspension, piano wire 8 mm in diameter can be used. Referring also to FIG. 7, ends of the wires 68a are held in the mounting blocks 112 which include apertures 113 (shown in FIG. 10). The mounting blocks 112 are held to the sides of the inner plates 60 by the trailing arm mounting bolt 94 which also extends through the aperture 113 of the associated block 112. According to a feature of the invention, relative rotation between the mounting block 112 and its associated inside hanger plate 60 is inhibited by wire extensions 114 (shown in FIG. 7) which extend beyond the mounting block 112 and are engageable with a bottom edge of the inside mounting plate 60.

According to a further aspect of this feature of the invention, the bores 96a, 98a, 113 (see FIG. 10) of the spacers 96, 98 and mounting block 112, respectively, are sized to closely fit the mounting bolt 94. By maintaining a close fit between the bolt 94 and the bores of these components, the mounting for the trailing arm can better support longitudinal loads without causing shifting in the bolt 94 with respect to the hanger brackets 14. As explained above, the plates 60, 62 which comprise the hanger bracket, each include an oblong slot (72, 80, respectively) through which the bolt 94 extends. The purpose of the oblong slot is to allow longitudinal adjustment of the trailing arms, thereby providing precise positioning of the axle to which the arms are attached. It is important that the axle be square with respect to the frame in order to minimize tire wear which has been a problem in the truck industry.

Once the bolt 94 has been secured by the nut 94a, relative movement between the bolt 94 and the plate 60 is resisted by the clamping force on the plate 60 generated between the block 112 and the inboard side of the spacer 96, so long as the bolt 94 cannot move side to side within the bores of these components. In effect, by closely fitting the bores 113, 96a of these components to the bolt size, frictional contact between the block 112 and the inboard side of the plate 60, as well as the frictional contact between the outboard side of the plate 60 and the inboard side of the spacer 96 are used to resist relative movement between the bolt 94 and the plate 60.

Similarly, the bores 98a, 105 in the spacer 98, and the adjustment plate 108, respectively, are also sized to closely fit the bolt 94. In this way, the frictional force generated by the clamping of the plate 62 between the spacer 98 and the adjustment plate 108 resists relative movement between the bolt 94 and the plate 62.

Figure 10:
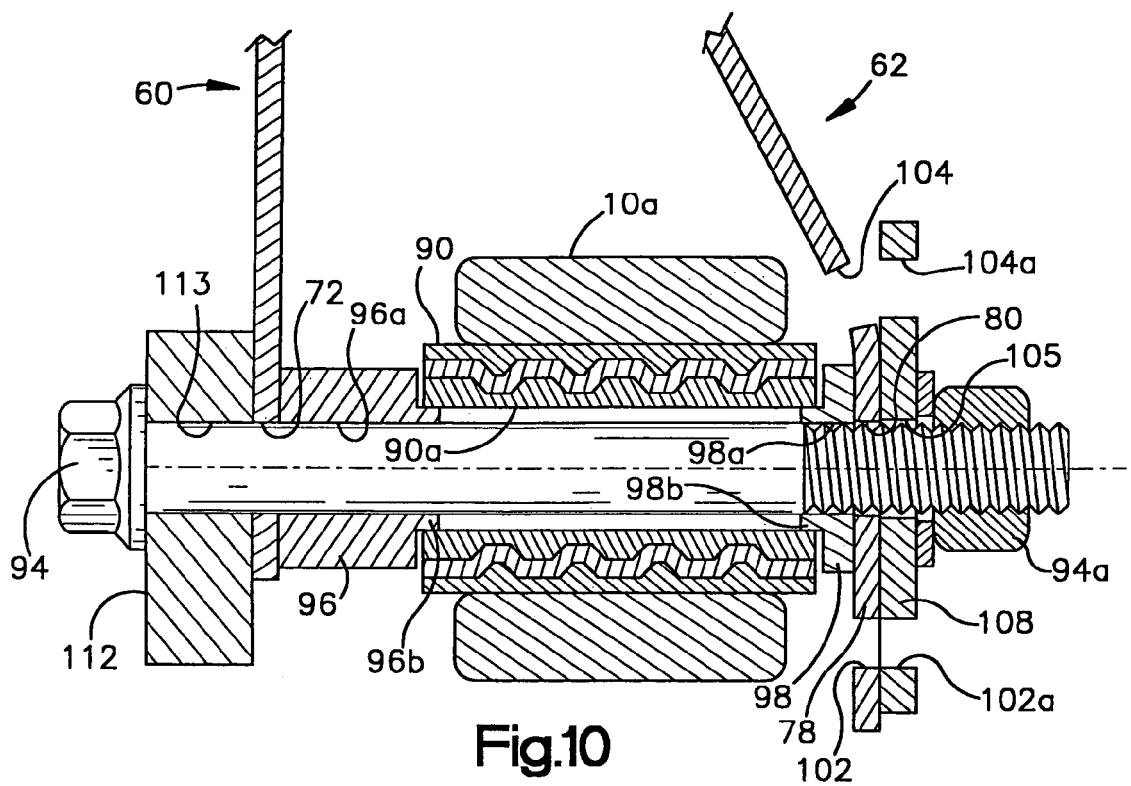
FIG. 10 is a sectional view of a trailing arm mounting constructed in accordance with the present invention as seen from the plane indicated by the line 10 in FIG. 1. with the components shown in a position before final torquing of a securement fastener is made; and, FIG. 11 illustrates the trailing arm mounting shown in FIG. 10 after the securement fastener is torqued.
Figure 11:
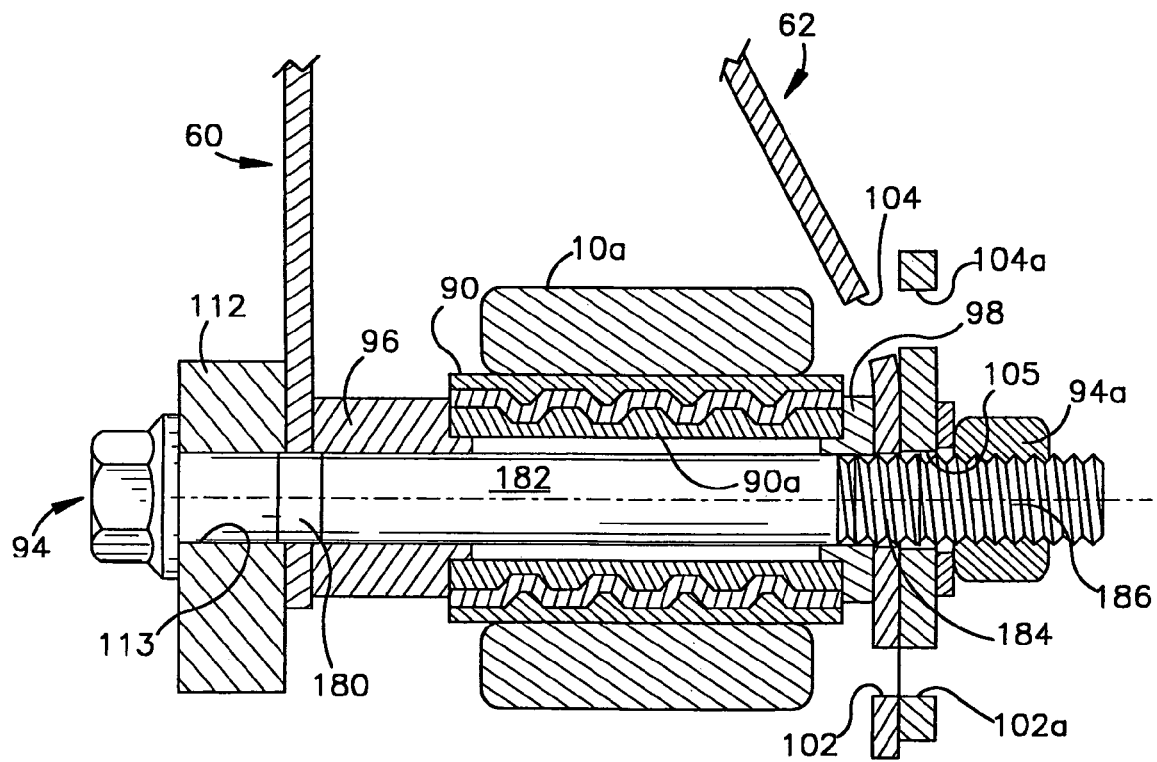

FIGS. 10 and 11 illustrate another feature of this aspect of the invention. As indicated above, the bores 96a, 98a 113,105 in the spacers 96, 98, the mounting block 112 and the adjustment plate 104 are sized to closely fit the securement bolt 94. Although the bushing 90 forming part of the trailing arm mount 10a can also include a bore sized to closely fit the bolt 94, in the preferred embodiment the arrangement shown in FIGS. 10 and 11 is used to constrict relative movement between the bolt 94 and the bushing 90.

Referring in particular to FIGS. 10 and 11, the spacer 96 includes a lip 96b and the spacer 98 includes a lip 98b. The outside diameter of the lips 96b, 98b are sized to tightly fit within a bore 90a formed in the trailing arm bushing 90. The lips 96b, 98b secure the bushing 90 to the spacers 96, 98 and substantially resist relative movement between the trailing arm bushing 90 and the spacers 96, 98. Since the spacers 96, 98 have bores that closely fit the bolt 94, relative movement between the bolt 94 and the trailing arm bushing 90 is substantially resisted. This arrangement assures frictional coupling between the plates 60, 62 and their adjacent mounting components, while at the same time providing a mounting for the trailing arm that resists relative movement between the trailing arm mount 10a and the bolt 94. This is achieved without requiring that the bore 90a of the trailing arm bushing 90 be sized to closely fit the bolt 94, which would make assembly of the components more difficult.

FIG. 11 illustrates the position of the spacers 96, 98 with respect to the bushing 90 after the bolt 94 is torqued to its final position by the nut 94a. As seen in FIG. 11, the lips 96b, 98b are forced into the bore 90a of the bushing 90, such that the sides of the bushing 90a are tightly clamped between the spacers 96, 98.

As far as dimensions are concerned, in a Class 8 truck, a bolt with a diameter of approximately 20 mm has been found to function satisfactorily in this application. In order to facilitate assembly, the bores 113, 96a of the mounting block 112 and the spacer 96 are sized as 20.2 mm, whereas the bores for the spacer 98 and adjustment plate 108 are sized as 20.1 mm.

To further facilitate assembly, the bolt has various diameters along its shank. In particular, a section of the bolt indicated by the reference character 180 preferably has a diameter of 20.2 mm. The next adjacent section indicated by the reference character 182 has a diameter of 20 mm. The next adjacent section indicated by the reference character 184 has a diameter of 20.1 mm. The final section of the bolt indicated by the reference character 186 has a diameter of 20 mm.

When the disclosed suspension is adapted for use on a Class 8 truck, significant lowering of the pivot axis for the trailing arms 10 can be achieved resulting in substantially improved suspension performance. In particular, in a prior art suspension for a Class 8 truck, the distance between the bottom of the frame rail 16 and the trailing arm pivot axis is typically around 100 mm. Depending on tire size, the distance between the pivot axis and ground level in a conventional truck will be 500 mm to 600 mm. With the use of "taller" hanger brackets 14 constructed and used in accordance with the present invention, the distance between the bottom of the frame member 16 and the pivot axis 19 can be increased to at least 300 mm and possibly 400 mm. This results in a pivot axis to ground dimension (again, depending on tire size) to be in the neighborhood of 300 mm to 400 mm. This substantial lowering of the trailing arm pivot axis 19 substantially improves performance of the suspension. It should be understood that the present suspension can be adapted to other types of vehicles to achieve similar performance improvements.

Referring now to FIGS. 2 and 8, another aspect of the invention is illustrated. Prior art truck air suspensions typically include a bridge (not shown) which is attached to the trailing ends of the left and right trailing arms. This prior art bridge includes seats for the air springs which are typically mounted a substantial distance inboard of the axle ends, due to space restrictions. The positioning of the air springs inboard of the trailing arms produces moment forces on the trailing arms tending to generate bending stresses due to twisting of the arms.

According to the invention, the air springs 22 are connected to the trailing ends of their associated trailing arm 10 by the spring seat 21 (shown best in FIG. 8) which is attached to the trailing end 20 of the trailing arm 10 by a pair of bolts 142. It should be noted, that the bolts 142 also secure the shock bracket 24 to the trailing arm. As seen best in FIG. 8, the centerline of the air spring (indicated by the reference character 144) is but a short distance inboard of the trailing arm 10 and, hence, twisting of the trailing arm is substantially decreased.

It should also be noted that the mounting location for the air spring takes advantage of the clearance provided by the inside periphery of the truck wheel W. Referring also to FIG. 2, the top of the air spring is attached to the frame rail 16 by a bracket 148. In the preferred embodiment, the centerline 144 of the air spring 22 is located at the frame sheer center of the frame rail 16. For a Class 8 truck of the type described, the frame sheer center is approximately 15 mm to the outside of the frame rail. By locating the air spring in the manner described, torsion forces and twisting of the frame rail is reduced which can reduce the strength requirement for the frame rail cross members resulting in less weight and lower cost.

According to a further aspect of this invention, a smaller air spring can be used that is operated at a higher pressure.

According to still another feature of the invention, the shock bracket 24 includes protection for the lower part of the shock 26. More specifically, the bracket 24 includes a pair of ears 24a (shown best in FIG. 8) which extend beyond the periphery of the shock 26. Should the vehicle be backed into an obstruction, the ears 24a will contact the obstruction and absorb the initial impact. The bracket 24 is designed to absorb the shock of the impact and will bend to absorb the impact forces, thus reducing the possibility of damage to the shock.

Referring now to FIGS. 2, 3 and 3A, another feature of the invention is illustrated. To facilitate assembly of the truck suspension, the supplemental locating member 40 can be used to lock the position of the suspension with respect to the frame members 16, 18. In particular, and as shown in FIG. 2, a bar 154, preferably square in cross-section, can be used to lock the finger 40b to the catcher bracket 44 which is mounted to the frame rail 16. In particular, the abutments 44a, 44b each include a hole 155 complementally-shaped to the bar 154. In the preferred embodiment, the holes in the abutments are also square in cross-section. The finger 40b, as best shown in FIGS. 3 and 3A, includes a transverse hole 156 also square in cross-section. During initial assembly, the hole in the finger 40b is aligned with the holes 155 in the abutments 44a, 44b and the locking bar 154 is then pushed through the holes in the abutments and the finger 40b. This locks the position of the suspension and inhibits relative movement between the axle 41 and the frame members 16, 18 during the assembly process, thus facilitating assembly. During assembly of prior art suspensions the suspension cushions are usually filled with air to support the axle. This feature of the invention may make the filling of the air cushions unnecessary or if the cushions are filled, their pressurization does not produce any movement in the axle with respect to the frame because of the locking bar 154. Once the assembly of the vehicle is complete, the bars are easily removed to release the axle and allow relative movement between the axle and the frame.

For assembly of some trucks, it is common to assemble the suspension to the frame members, with the vehicle turned upside-down. After completion of the assembly, the frame must be overturned. The locking members 154 facilitate this operation. Moreover, in prior art vehicles the air springs have to be filled with air prior to engine starting, since the air supply is provided by an engine driven pump. The feature which allows the suspension to be locked with the locking bars 154 eliminates the need for prefilling of the air springs prior to engine start-up.

Figure 9:
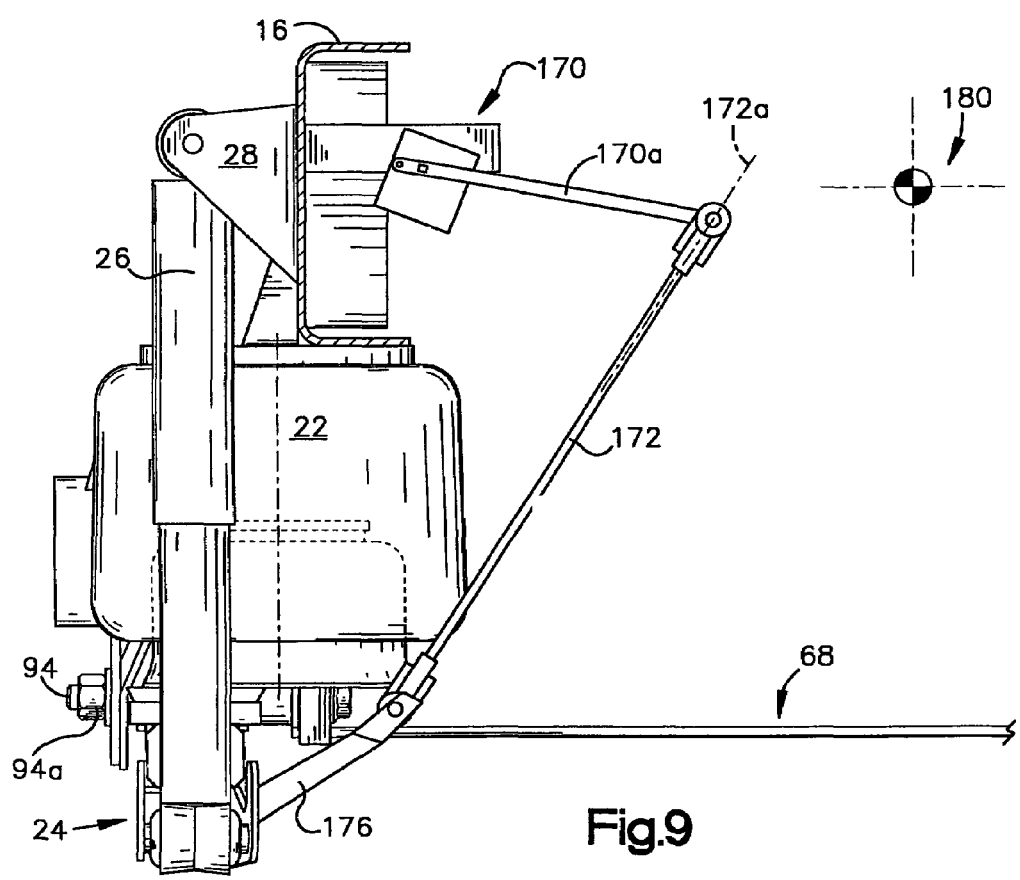
FIG. 9 is a fragmentary, rear view of a rear suspension that includes a height control system.

FIG. 9 illustrates another aspect of the invention. It is typical for highway trucks having air suspensions to provide an automatic height control. In the past, a height control valve was mounted at the centerline of the vehicle and included an operating rod connected to the axle. In recent years, it has been found desirable to have the height control valve connected to the leading axle in a tandem axle truck, so that the height of the frame with respect to the leading axle is controlled. In trucks in which both axles are driven, it has been found that the height control valve cannot be connected to a center point on the leading drive axle due to the presence of the inter-axle drive shaft. As a result, in more recent years, the height control valve has been moved outboard with respect to the centerline of the vehicle. As a result, it has been found that height control of the vehicle cannot be as precisely maintained as it could when the valve was mounted centrally in the vehicle. In particular, it was found that a small but perceptible error in height control could occur when the vehicle was rounding a curve.

FIG. 9 illustrates a height control arrangement in which errors in height control when rounding a curve are eliminated or substantially reduced. In particular, a height control valve 170 is mounted to the frame member 16. An operating arm 170*a* extends laterally from the height control valve 170. A height control rod 172 is pivotally connected to the distal end of the operating lever 170*a* of the height control valve 170 and extends downwardly in an angled orientation, and is connected to the rear suspension. In the illustrated embodiment, a mounting bracket 176 extends from the shock mount bracket 24. The lower end of the height control rod 172 is connected to this bracket.

FIG. 9 also indicates the roll center 180 of the vehicle. As can be seen in FIG. 9, the height control rod 172 generally points towards the roll center of the vehicle. By positioning the axis 172*a* of the height control rod 172 so that it passes through or closely adjacent the roll center 180 of the vehicle, the roll of the vehicle body that occurs when rounding a curve will not substantially affect the position of the operating lever 170*a* of the height control valve 170. As a result, the valve 170 will not operate to either admit or release air from the air springs 22 while the vehicle rounds a curve. The illustrated configuration provides the advantages of a centrally mounted air valve, operated by linkage connected to the center of the axle.

It should be noted here that the suspension features described above can be used together or separately. For example, the invention contemplates use of the supplemental axle locating feature for use with other types of suspensions, including suspensions using trailing arms comprised of multiple leaves, or even conventional leaf suspensions that do not employ trailing arms. Similarly, the suspension locking feature can be used with the illustrated suspension or with more conventional suspensions to which the supplemental locating member is adapted.

The use of compliant hanger brackets which allow lowering of the trailing arm pivot can be used with or without the supplemental axle locating member and with or without the height control configuration.

Although the invention has been described with a certain degree of particularity, it should be noted that those skilled in the art can make various changes to it with without departing from the spirit or scope of the invention as hereinafter claimed.

We claim:

1. A vehicle suspension assembly for a vehicle having two parallel, laterally spaced frame members and an axle perpendicular to the frame members, comprising:
   a pneumatic spring for resiliently supporting one of the frame members with respect to the axle;
   a control valve for controlling pressurization of said pneumatic spring mounted to an inboard side of said one frame member;
   a control lever operably connected to the valve and extending laterally inboard from said one frame member to a distal end;
   an operating rod for said control valve having a first end pivotally connected to the distal end of said control lever and a second end coupled to said axle at a position laterally outward of a roll center of a vehicle and laterally outward of said first end wherein, an axis of said operating rod extends through or in close proximity to said roll center of a vehicle.

2. The suspension of claim 1, further including a shock absorber for damping movements in said axle and a mounting member connecting said shock absorber to said axle, wherein said second end of said operating rod is connected to said mounting member and thereby coupled to said axle.

3. The suspension assembly of claim 1, further including a trailing arm connected to said one frame member, said trailing arm including a seat for supporting said pneumatic spring and a shock mounting apparatus for connecting a lower end of a shock absorber to said trailing arm.

4. The suspension assembly of claim 3, wherein said spring seat and said shock mounting apparatus are arranged such that an axis of said spring and an axis of said shock absorber are substantially along a longitudinal dimension of said trailing arm.

5. The suspension assembly of claim 1, wherein the vehicle has a horizontal plane defined by the frame members and a vertical direction perpendicular to the horizontal plane, and wherein said operating rod extends from the axle toward the roll center of the vehicle at an angle between the horizontal plane and vertical direction, wherein rolling movement in the vehicle causing relative movement of said one frame member with respect to said axle does not produce substantial movement in said control lever.

6. The suspension assembly of claim 3, wherein said shock mounting apparatus is located at a distal end of said trailing arm.

7. The suspension assembly of claim 3, wherein said shock mounting apparatus comprises a bracket extending rearwardly from said trailing arm and is secured thereto using fasteners that also secure said spring seat to said trailing arm.

8. A vehicle suspension assembly in a vehicle having two, longitudinally extending, laterally spaced frame members and at least one axle extending perpendicularly between the frame members and coupled to the frame members by the suspension assembly, the vehicle having a roll center located between the frame members, the suspension assembly comprising:
- a pneumatic spring mounted between one of said frame members and the axle for resiliently supporting said one frame member with respect to the axle;
- a control valve for controlling pressurization of said pneumatic spring mounted to an inboard side of said one frame member;
- a control lever operably connected to the control valve and extending laterally inboard from said frame member;
- an operating rod for said control valve having one end pivotally connected to said control lever at a first point laterally inboard of said control valve and a second end coupled to said axle at a second point vertically below the control valve and laterally outward of the first point; wherein,
- an axis of said operating rod extends through or in close proximity to said roll center of said vehicle.

9. A suspension assembly for a vehicle having two longitudinally extending, laterally spaced frame members and a drive axle extending laterally between and coupled to said frame members, the vehicle having a roll center approximately midway between said frame members, the suspension assembly comprising:
- a pneumatic spring mounted between and resiliently supporting one of said frame members with respect to the drive axle;
- a control valve for controlling pressurization of said pneumatic spring mounted to said one frame member;
- a control lever operably connected to the control valve and extending laterally inboard of said one frame member to a terminal end;
- an operating rod for said control valve having one end operatively connected to the terminal end of said control lever and a second end coupled to said drive axle at a point laterally outboard of said terminal end and vertically below the control valve; wherein, the operating rod is positioned at an angle oblique to a horizontal plane defined by the frame members such that an axis of the operating rod is directed toward the roll center of the vehicle.

10. The suspension assembly of claim 9, further comprising a trailing arm supporting said axle, said trailing arm operatively connected to said frame member and wherein said pneumatic spring is attached to a spring seat forming part of said trailing arm.

11. The suspension assembly of claim 9, wherein said drive axle is a leading drive axle of a tandem axle arrangement.

\* \* \* \* \*